United States Patent
Kim et al.

(10) Patent No.: US 10,534,127 B2
(45) Date of Patent: Jan. 14, 2020

(54) BACKLIGHT UNIT AND LIQUID CRYSTAL DISPLAY DEVICE INCLUDING THE SAME

(71) Applicant: LG Display Co., Ltd., Seoul (KR)

(72) Inventors: Young Sam Kim, Gyeongsangbuk-do (KR); Jong Chil Lee, Gyeongsangbuk-do (KR)

(73) Assignee: LG Display Co., Ltd., Seoul (KR)

(*) Notice: Subject to any disclaimer, the term of this patent is extended or adjusted under 35 U.S.C. 154(b) by 65 days.

(21) Appl. No.: 14/873,405

(22) Filed: Oct. 2, 2015

(65) Prior Publication Data
US 2016/0097889 A1  Apr. 7, 2016

(30) Foreign Application Priority Data
Oct. 7, 2014  (KR) .......... 10-2014-0134996

(51) Int. Cl.
*F21V 8/00* (2006.01)

(52) U.S. Cl.
CPC ........... *G02B 6/005* (2013.01); *G02B 6/0053* (2013.01)

(58) Field of Classification Search
CPC .................................................. G02B 6/0053
See application file for complete search history.

(56) References Cited

U.S. PATENT DOCUMENTS

| | | | |
|---|---|---|---|
| 9,207,383 B2 | 12/2015 | Kim et al. | |
| 2003/0184691 A1* | 10/2003 | Miyashita | G02B 6/0038 349/61 |
| 2006/0109682 A1 | 5/2006 | Ko et al. | |
| 2010/0104816 A1* | 4/2010 | Wu | G02B 3/0006 428/172 |
| 2011/0242794 A1* | 10/2011 | Nakamura | G02F 1/133615 362/97.1 |
| 2011/0304524 A1* | 12/2011 | Seen | H04M 1/22 345/55 |

(Continued)

FOREIGN PATENT DOCUMENTS

| | | |
|---|---|---|
| CN | 1779522 A | 5/2006 |
| CN | 102759772 A | 10/2012 |

(Continued)

OTHER PUBLICATIONS

The First Office Action dated Mar. 28, 2018, from the State Intellectual Property Office of People's Republic of China in counterpart Chinese application No. 201510633928.8.

(Continued)

*Primary Examiner* — Alexander K Garlen
*Assistant Examiner* — Eric T Eide
(74) *Attorney, Agent, or Firm* — Morgan, Lewis & Bockius LLP

(57) ABSTRACT

A liquid crystal display device is disclosed. The liquid crystal display device includes a liquid crystal display panel, a light guide plate configured to guide blue light from a blue light source to the liquid crystal display panel and a light conversion sheet comprising a light conversion layer and a light compensation pattern positioned on edges of the light conversion layer configured to compensate blue light leakage at the edges of the light conversion sheet, wherein the light conversion sheet is positioned between the liquid crystal display panel and the light guide panel.

11 Claims, 5 Drawing Sheets

(56) References Cited

U.S. PATENT DOCUMENTS

| | | | |
|---|---|---|---|
| 2012/0113672 A1* | 5/2012 | Dubrow | B82Y 20/00 362/602 |
| 2012/0320628 A1* | 12/2012 | Chang | G02B 6/0025 362/609 |
| 2013/0135892 A1* | 5/2013 | Lee | G02B 6/0031 362/602 |
| 2013/0235613 A1* | 9/2013 | Cheong | G02B 6/0038 362/602 |
| 2013/0279191 A1* | 10/2013 | Chang | G02B 6/0055 362/607 |
| 2014/0022819 A1* | 1/2014 | Oh | G02B 6/005 362/607 |
| 2014/0063414 A1 | 3/2014 | Kim et al. | |
| 2014/0125921 A1* | 5/2014 | Takemura | B26D 7/27 349/65 |
| 2014/0153280 A1* | 6/2014 | Lee | G02B 5/23 362/606 |
| 2014/0319995 A1* | 10/2014 | Kim | G02F 1/133512 313/501 |
| 2015/0219936 A1* | 8/2015 | Kim | G02F 1/0105 362/97.1 |
| 2015/0338048 A1* | 11/2015 | Ahn | F21S 48/2243 362/511 |

FOREIGN PATENT DOCUMENTS

| | | | |
|---|---|---|---|
| CN | 103676311 A | 3/2014 | |
| CN | 104067164 A | 9/2014 | |
| KR | 10-2012-0068499 A | 6/2012 | |
| WO | WO 2013077568 A1 * | 5/2013 | ....... G02F 1/133512 |

OTHER PUBLICATIONS

Office Action dated Jun. 4, 2019, from the State Intellectual Property Office of People's Republic of China in counterpart Chinese application No. 201510633928.8. Note: US 201310135892 cited therein is already of record.

* cited by examiner

BACKLIGHT UNIT AND LIQUID CRYSTAL DISPLAY DEVICE INCLUDING THE SAME

CROSS-REFERENCE TO RELATED APPLICATIONS

The present application claims priority under 35 U.S.C. § 119(a) of Korean Patent Application No. 10-2014-0134996 filed on Oct. 7, 2014, which is hereby incorporated by reference in its entirety.

BACKGROUND

Field of the Disclosure

The present application relates to a liquid crystal display device, and more particularly, to a backlight unit adapted to minimize or prevent a light leakage fault generated along the edge of a liquid crystal display panel.

Description of the Related Art

Liquid crystal display (LCD) devices belong to technology-intensive and high value-added display devices. Such LCD devices exhibit low power consumption and superior portability.

An active matrix type LCD device includes thin film transistors which are used as switching elements and perform voltage-on/off control for each pixel. Such an active matrix type LCD device has high definition resolution and superior motion picture realization capability. In general, the LCD device includes an LCD panel which is fabricated by preparing two substrates, such as a so-called array substrate and a so-called color filter substrate and interposing a liquid crystal material between the two substrates. The array substrate is fabricated through an array substrate fabrication procedure which forms thin film transistors and pixel electrodes on a substrate. The color filter substrate is fabricated through a color filter substrate fabrication procedure which forms color filters and a common electrode on another substrate. The interposition of the liquid crystal material is performed by using a so-called cell process.

The LCD panel is not a self-emissive panel, but rather, the light transmittance of the LCD panel is controlled to display images. As such, a separated light source is necessary for the LCD panel. In accordance therewith, the LCD device includes a so-called backlight unit which includes a light source and is disposed near or under the rear surface of the LCD panel.

The backlight unit can be classified into a direct type and an edge type on the basis of the position of the light source. The direct type backlight unit allows the light source to be disposed under the LCD panel. As such, the direct type backlight unit emits light from the light source to be directly applied to the LCD panel. Meanwhile, the edge type backlight unit includes a light guide plate disposed under the LCD panel and a light source disposed at least one side surface or edge of the light guide plate. In such an edge type backlight unit, light emitted from the light source is indirectly applied to the LCD panel as a result of the total internal reflection through the light guide plate.

As a light source of the backlight unit, fluorescent lamps including a cold cathode fluorescent lamp (CCFL) and an external electrode fluorescent lamp (EEFL) have been mainly used. Nowadays, as the LCD device become thinner and lighter, the fluorescent lamps are being replaced by light emitting diodes (LEDs) which have advantages in power consumption, weight and brightness.

FIG. 1 is a planar view showing an LCD device of the related art in which a bluish light leakage fault is generated.

FIG. 2A is a cross-sectional view showing the structure of a backlight unit disposed in an LCD device of the related art. FIG. 2B is a graph illustrating wavelength characteristics of lights output from components of the related art backlight unit shown in FIG. 2A.

Referring to FIGS. 1, 2A and 2B, the LCD device 10 of the related art includes an LCD panel 30 and a backlight unit 50, which are combined with each other by an upper cover 20 and a lower cover. The upper cover 20 can be formed in a tetragonal rim structure with an opened central portion, but may have various other configurations. Such an upper cover 20 supports the edge of the LCD panel 30 surrounding a display area.

The backlight unit 50 includes a light source 60 having an LED package 60b which includes at least one LED 60a, and a light guide plate 51 configured to distribute the light generated by the light source 60 such that the overall surface of the light guide plate is configured to illuminate. Also, the backlight unit 50 includes a light conversion sheet 52, a first optical sheet 53 and a second optical sheet 54 which are sequentially disposed on the light guide plate 51.

The light conversion sheet 52 can be formed from a resin which has a refractive index and includes red quantum dots or green quantum dots, when the light source 50 is a blue light source. The quantum dots can also be referred to as quantum rods, nano-crystal, or other types of materials having similar quantum mechanical characteristics. As such, the light conversion sheet 60 can realize white light with a wider color gamut. White light with the wide color gamut means that each spectrum of the primary colors have a narrow FWHM (full width at half maximum) value as shown as a dashed line 54 in FIG. 2B.

In general, the light source 60 of the backlight unit 50 can emit blue light. In this case, the light guide plate 51 can output only light of blue wavelength. However, the light conversion sheet 52 can output red, green and blue lights generated by the quantum dots on the basis of the blue wavelength input from the light guide plate 51.

In other words, as shown in FIG. 2B, blue light input to the light conversion sheet 52 is converted into red and green lights by the scattered quantum dots within the light conversion sheet 52. As such, the light conversion sheet 52 can output red, green and blue lights toward the optical sheets.

However, only a portion of blue light may be converted into red and green lights and the remaining portion of blue light passes through the light conversion sheet 52 without any light conversion. Due to this, light output from the light conversion sheet 52 may become bluish light.

The first and second optical sheets 53 and 54 are configured to reflect a portion of light output from the light conversion sheet 52. A portion of reflected blue light can be additionally converted into red and green lights by the scattered (or distributed) quantum dots within the light conversion sheet 52. In accordance therewith, light output from the optical sheet can be converted into white light.

However, without the compensation pattern of the present disclosure, the frequency of hitting quantum dots at the edges of the light guide plate is not sufficient. That is, more blue light is output at the edges of the light guide plate compared to other areas of the light guide plate. With the compensation pattern, the light conversion sheet can provide more chances of converting the blue light into the green light and red light such that the bluish color displayed portions on the screen can be reduced as a result of overall white balance being achieved. In other words, a higher probability of hitting the quantum dots with the blue light can reduce undesirable blue light outputs, which increases the amount of the red and green light outputs to thus achieve better white balance across the entirety of the display screen. Therefore, undesirable bluish light can be converted into white light that is output more uniformly via the light guide plate.

That is, more chances to hit the quantum dots with the blue light can reduce the portion of the blue light output, but increase the output amount of the red and green lights. Therefore, bluish light can be adjusted to be converted into white light.

In this manner, the color conversion degree of blue light can be controlled by the configuration of optical sheets and the amount of the scattered quantum dots within the light conversion sheet 52.

However, as seen from the related art LCD device 10 of FIG. 1, bluish light BL is leaked along edges of the LCD panel 30. This results from the fact that more blue light is outputted at the edges of the light guide plate 51 compared to the other regions of the light guide plate 51. In other words, because the quantity of blue light output from the edges of the light guide plate 51 is larger than color conversion capacity of the light conversion sheet 52 and the optical sheets, light output from the edges of the LCD panel 30 can be perceived as a bluish color.

Light output through the first optical sheet 53 and the second optical sheet 54 can adjust its white balance at majority area of the related art LCD device 10 of FIG. 1. However, the light output at the edges of the light conversion sheet 52 and the light guide plate 51 output bluish light or blue light. Due to this, bluish light leaked at the edges of the LCD panel 30 deteriorates the image quality of the related art LCD device 10 FIG. 1.

SUMMARY

Accordingly, the present application is directed to a backlight unit and an LCD device with the same that substantially obviate one or more of problems due to the limitations and disadvantages of the related art.

An object of the present invention is to provide a backlight unit and an LCD device with the same that are adapted to enhance image quality and color gamut of the LCD device by disposing light compensation patterns along the edge of a light conversion sheet.

Another object of the present invention is to provide a backlight unit and an LCD device with the same that are adapted to enhance image quality and light efficiency through recycle of light by disposing light compensation patterns with a high refractive index along the edge of a light conversion sheet.

Additional features and advantages of the embodiments will be set forth in the description which follows, and in part will be apparent from the description, or may be learned by practice of the embodiments. The objectives and other advantages of the invention will be realized and attained by the structure particularly pointed out in the written description and claims hereof as well as the appended drawings.

To achieve these and other advantages and in accordance with the purpose of the present invention, a backlight unit according to an aspect of the present embodiment comprises a light guide plate configured to guide blue light from a blue light source; and a light conversion sheet comprising a light conversion layer and a light compensation pattern on edges of the light conversion layer configured to compensate for leakage of blue light guided from the light guide plate, the leakage occurring at the edges of the light conversion sheet.

In another aspect, a backlight unit comprises a light guide plate configured to guide blue light from a blue light source; and a light conversion sheet comprising a light conversion layer configured to compensate blue light leakage at the edges of the light conversion sheet having a first thickness within a first area and a second thickness within a second area, wherein the second area is the edges of the first area and the second thickness is thicker than the first thickness, wherein the light conversion layer including a first light conversion element configured to convert a portion of the blue light into a portion of green light and a second light conversion element configured to convert another portion of the blue light into a portion of a red light.

In another aspect, an LCD device comprises a liquid crystal display panel; a light guide plate configured to guide blue light from a blue light source to the liquid crystal display panel; and a light conversion sheet comprising a light conversion layer and a light compensation pattern positioned on edges of the light conversion layer configured to compensate blue light leakage at the edges of the light conversion sheet, wherein the light conversion sheet is positioned between the liquid crystal display panel and the light guide panel.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated herein and constitute a part of this application, illustrate embodiment(s) of the present disclosure and together with the description serve to explain the disclosure. In the drawings.

DETAILED DESCRIPTION OF THE ILLUSTRATED EMBODIMENTS

Figure 1:
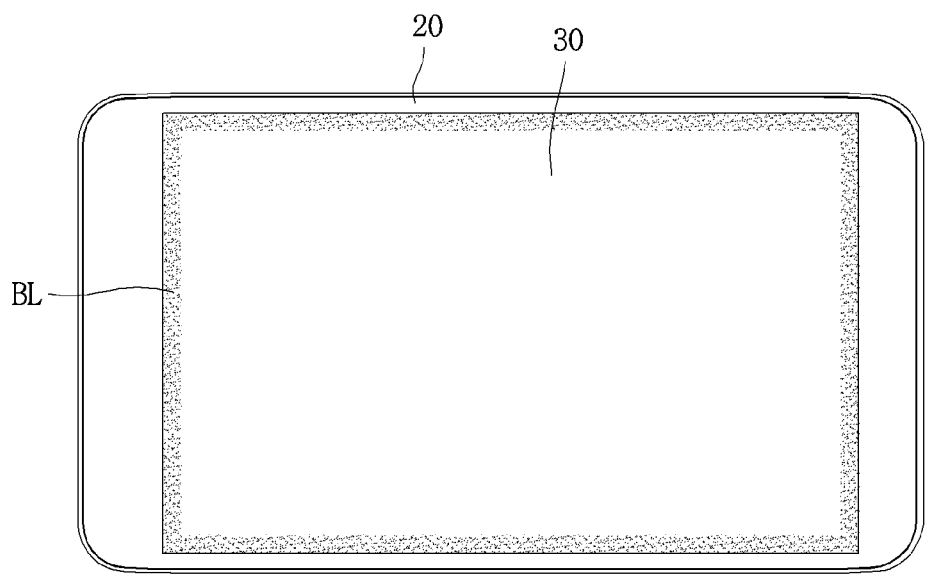
FIG. 1 is a planar view showing an LCD device of the related art in which a bluish light leakage fault is generated.
Figure 2A:
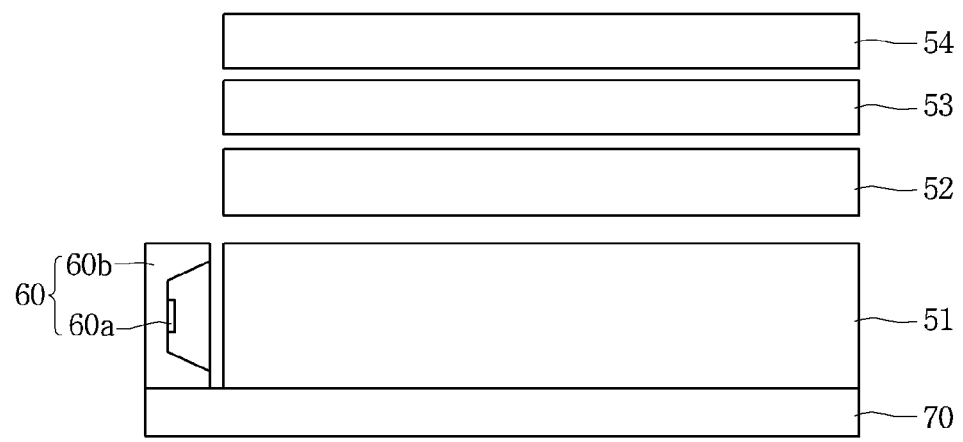
FIG. 2A is a cross-sectional view showing the structure of a backlight unit provided in an LCD device of the related art.
Figure 2B:
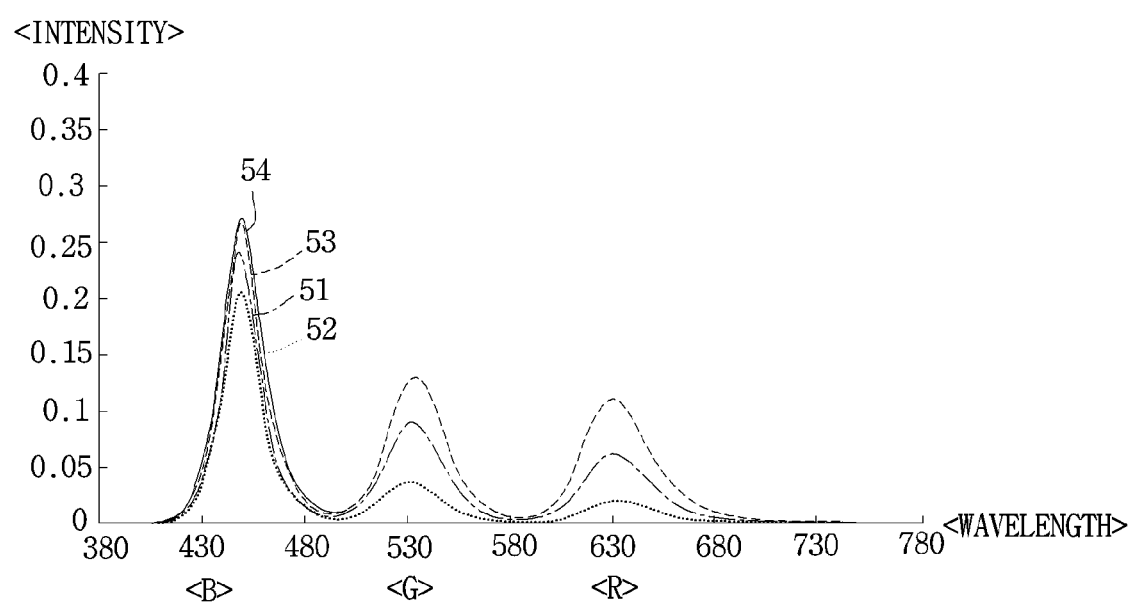
FIG. 2B is a graph illustrating wavelength characteristics of lights output from components of the backlight unit shown in FIG. 2A.

Advantages and features of the present disclosure, and implementation methods thereof will be clarified through the following embodiments described with reference to the accompanying drawings. These embodiments introduced hereinafter are provided as examples to the ordinary skilled person in the art. As such, these embodiments might be embodied in a different shape, so are not limited to these embodiments described here. Therefore, the present disclosure must be defined by scopes of claims.

In the following description, numerous specific details are set forth, such as particular structures, sizes, ratios, angles, coefficients and so on, in order to provide an understanding of the various embodiments of the present disclosure. The same reference numbers will be used throughout this disclosure to refer to the same or like parts. In other instances, well-known technologies have not been described in detail in order to avoid obscuring the present disclosure.

It will be further understood that the terms "comprises", "comprising,", "has", "having", "includes" and/or "including", when used herein, specify the presence of stated features, integers, steps, operations, elements, and/or components, but do not preclude the presence or addition of one or more other features, integers, steps, operations, elements, components, and/or groups thereof. As used herein, the singular forms "a", "an" and "the" are intended to include the plural forms as well, unless the context clearly indicates otherwise.

Elements used in the present disclosure without additional specific details must be considered to include tolerance.

In the description of embodiments, when a structure is described as being positioned "on or above" or "under or below" another structure, this description should be construed as including a case in which the structures contact each other as well as a case in which a third structure is disposed therebetween.

The temporal terms of "after", "subsequently", "next", "before" and so on used in this disclosure without specifying "immediately" or "directly" can include other discontinuously temporal relations.

Moreover, although some of the elements are designated with numerical terms (e.g., first, second, third, etc.), it should be understood that such designations are only used to specify one element from a group of similar elements, but not to limit the element in any specific order. As such, an element designated as a first element could be termed as a second element or as third element without departing from the scope of exemplary embodiments.

The features of various exemplary embodiments of the present disclosure may be partially or entirely bound or combined with each other, and be technically engaged and driven using various methods as apparent to those skilled in the art, and the exemplary embodiments may be independently practiced alone or in combination.

Reference will now be made in detail to embodiments of the present disclosure, examples of which are illustrated in the accompanying drawings. In the drawings, the size, thickness and so on of a device can be exaggerated for convenience of explanation. Wherever possible, the same reference numbers will be used throughout this disclosure including the drawings to refer to the same or like parts.

Figure 3:
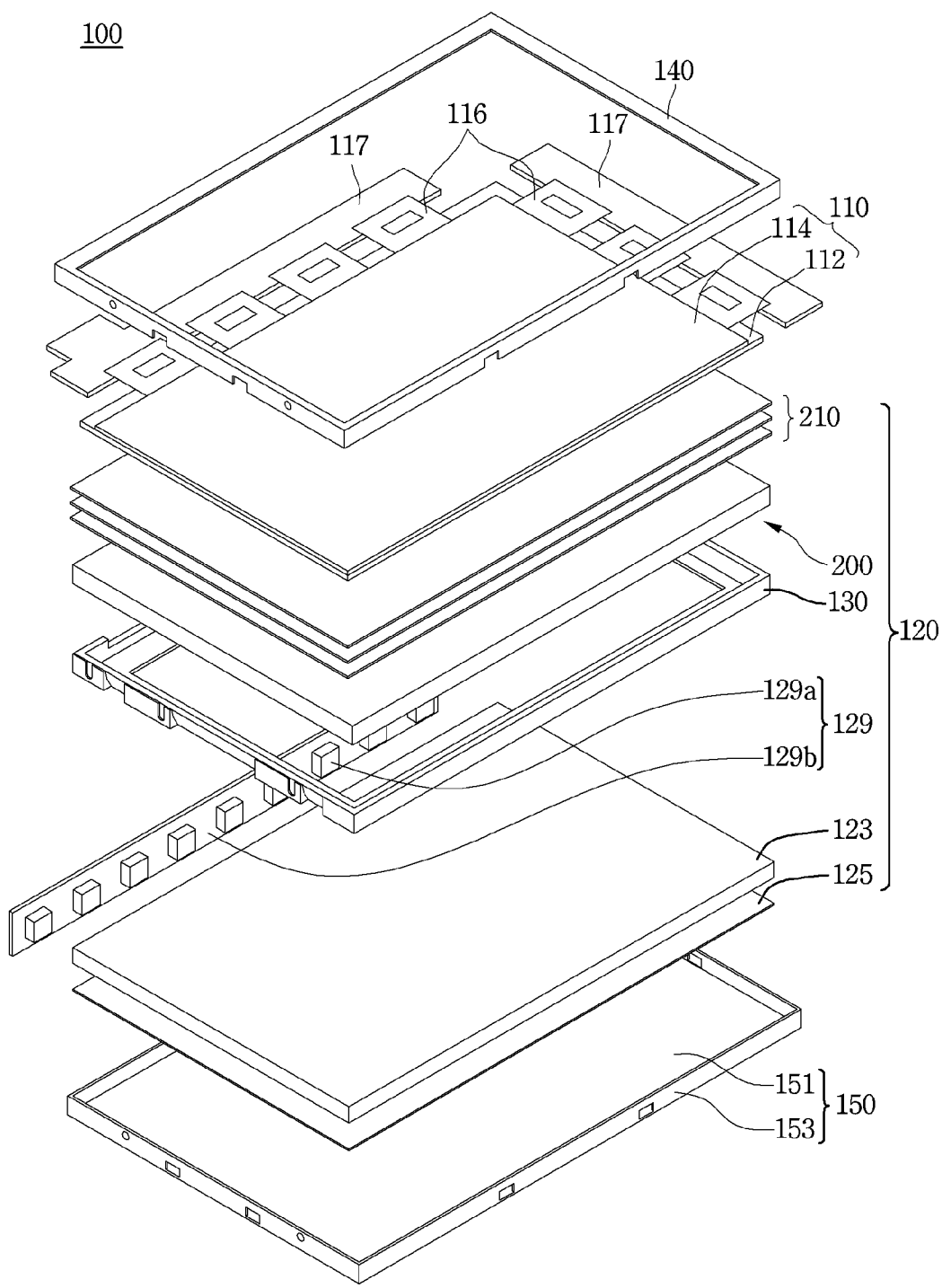
FIG. 3 is an exploded perspective view showing an LCD device according an embodiment of the present disclosure.
Figure 4:
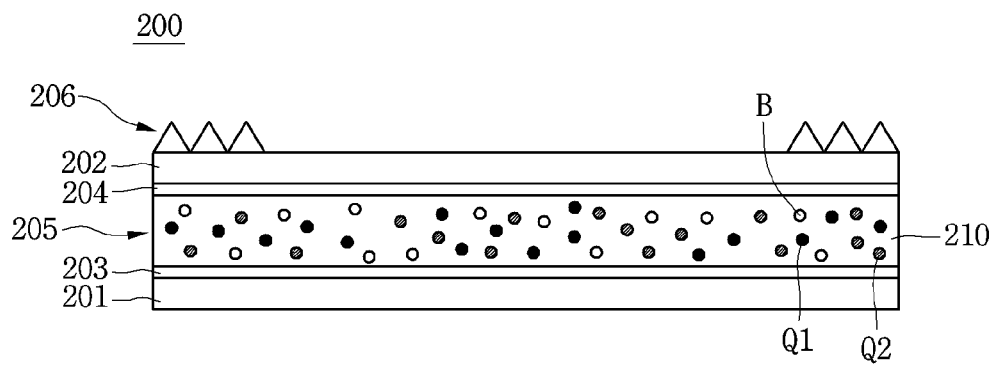
FIG. 4 is a cross-sectional view showing the structure of a light conversion sheet, which is used in an LCD device, according to an embodiment of the present disclosure.

FIG. 3 is an exploded perspective view showing an LCD device according an embodiment of the present disclosure. FIG. 4 is a cross-sectional view showing the structure of a light conversion sheet, which is used in an LCD device, according to an embodiment of the present disclosure.

Referring to FIGS. 3 and 4, the LCD device 100 includes an LCD panel 110 and a backlight unit 120. Also, the LCD device includes a support main 130, a lower cover 150 and a top cover 140 which are used to modularize the LCD panel 110 and the backlight unit 120.

In other words, the LCD panel 110 and the backlight unit 12 is modularized by the support main 130, the top cover 140 and the lower cover 150. To this end, the top cover 140 is formed in a tetragonal shape with a cross-section structure which is bent in a shape of "]", in order to cover side surface and upper surface edges of the LCD panel 110. As such, an image displayed on the LCD panel 110 can be viewed to users through the opened upper surface of the top cover 140.

The lower cover 150 receives the LCD panel 110 and the backlight unit 120. In other words, the lower cover 150 is used as a substructure combining the components of the LCD device 100. To this end, the lower cover 150 includes a horizontal surface (or a bottom surface) 151 being in close contact with the rear surface of the backlight unit 120 and side surfaces 153 upwardly bent from edges of the horizontal surface 151 in a perpendicular direction thereto.

The support main 130 is placed on the lower cover 150 and combined with the top cover 140 and the lower cover 150 in such a manner as to surround the edge of the LCD panel 110 and backlight unit 120. Such a support main 130 is formed in the shape of a tetragonal rim with an opened side surface.

Such a top cover 140 is called a case top or a top case. The support main 130 is called a guide panel, a main support or a mold frame. The lower cover 150 is called a bottom cover or a cover bottom.

The LCD panel 110 performs an important function of displaying images. To this end, the LCD panel 110 includes an array substrate 112 and a color filter substrate 114 which are combined with each other with having a liquid crystal layer therebetween.

The array substrate 112 is called a lower substrate or a thin film transistor substrate. Such an array substrate 112 is typically defined into pixel regions by pluralities of gate lines and data lines which cross each other and are formed in the inner surface of the array substrate. The array substrate 112 includes thin film transistors formed at or near intersections of the data lines and the gate lines. The thin film transistors are connected one by one to transparent pixel electrodes which are formed in the pixel regions.

The color filter substrate 114 is called an upper substrate. Such a color filter substrate 114 includes red, green and blue color filters and a black matrix which are formed on the inner surface of the color filter substrate 114. The red, green and blue color filters are formed opposite to pixel regions. The black matrix surrounds each of the red, green and blue color filters and shields the gate lines, the data lines and the thin film transistors. Also the color filter substrate 114 includes a transparent common electrode covering the red, green and blue filters and the black matrix.

Such an LCD device 100 can be formed in one of IPS (in-plane switching) and FFS (fringe field switching) modes. In this case, the pixel electrodes and the common electrode are arranged on the array substrate 112.

Also, the LCD device 110 includes polarizers attached to outer surfaces of the array substrate 112 and the color filter substrate 114. Each of the polarizers selectively transmits only specified light of certain wavelengths.

The LCD device further includes at least one printed circuit board 117 (or other circuit substrates) connected to at least one edge of the LCD panel 110. The printed circuit board 117 is connected to the edge of the LCD panel 110 using a connection member 116 such as flexible printed circuit board or a tape carrier package (TCP). As such, the printed circuit board 117 is configured to lean towards and come in close contact with a side surface of the support main 130 or the rear surface of the lower cover 150 upon a modularizing process.

The thin film transistors on the LCD panel 110 are selectively turned-on gate line by gate line in response to an on/off signal from a gate driver (or other gate control circuit). The turned-on thin film transistors transfer signal voltages, which are applied from a data driver (or other data control circuit) through the respective data lines, to the respective pixel electrodes. As such, liquid crystal molecular alignment is directionally varied and light transmittance differences are controlled in the LCD panel 100.

In order to externally reveal the transmittance differences in the LCD panel 110, the backlight unit 120 supplying light to the LCD panel 110 is included in the LCD device 100.

The backlight unit 120 includes an LED assembly 129 (or other type of light source) and a reflection plate 125 (or other type of reflector means) with one of silver and white colors. Also, the backlight unit 120 includes a light guide plate 123 disposed on the reflection plate 125, optical sheets 211 disposed above the light guide plate 123, and a light conversion sheet 200 interposed between the optical sheets 211 and the light guide plate 123.

The light conversion sheet 200 is formed in a tetragonal plate shape similar to the light guide plate 123 and the optical sheets 211 but not limited thereto. In order to enhance light output efficiency, the light conversion sheet 200 includes a light conversion layer 205, which includes quantum dots, and light compensation patterns 206 formed along the edge of the light conversion layer 205.

The LED assembly 129 is disposed on at least one side surface of the light guide plate 123 which is used as a light-input surface thereof. Also, the LED assembly 129 includes a plurality of LEDs 129a arranged in a fixed interval or in some other desired pattern, and a printed circuit board (PCB) 129b with the plurality of LEDs 129a.

Such an LED assembly 120 can be formed in a top view type which allows the plurality of LEDs 129a to emit light in a perpendicular direction to the PCB 129b but not limited thereto and the LCD assembly maybe formed in a side view type.

The LEDs 129a include blue LEDs, each emitting blue light with a wavelength of about 430 nm-450 nm, corresponding to the light conversion sheet 200.

In other words, the backlight unit 120 according to the present disclosure cannot solely use the blue LEDs 129a but also requires the light conversion layer 205 of the light conversion sheet 200 to be formed from a material which includes red and green quantum dots, or a green fluorescent substance and red quantum dots, or a red fluorescent substance and green quantum dots.

The reflection plate 125 reflects light outputted through the rear surface of the light guide plate 123 such that light is reflected towards the LCD panel 110. As such, the reflection plate 125 can increase brightness (or luminance) of the light output of the backlight unit 120.

The optical sheets 211 disposed on or near the light guide plate 123 and the light conversion sheet 211. The optical sheet 211 may include a diffusion sheet and at least one light collecting sheet. Such optical sheets 211 diffuse and collect (or converge) the light passed through the light guide plate 123 and the light conversion sheet 200. As such, the optical sheets 211 can improve the luminance uniformity of the LCD panel 110.

Such a light conversion sheet 200 according to the present disclosure will now be described in detail with reference to FIG. 4.

The light conversion sheet 200 according to the present disclosure includes a first substrate 201 and a second substrate 202, each formed with an insulation material having a certain degree of transparency, and a light conversion layer 205 interposed between the first and second substrates 201 and 202. Also, the light conversion sheet 200 includes a first barrier 203 (or similar functional element) interposed between the first substrate 201 and the light conversion layer 205, and a second barrier layer 204 (or similar functional element) interposed between the light conversion layer 205 and the second substrate 202.

The first barrier 203 and the second barrier layer 204 are attached to the first substrate 201 and the second substrates 202 respectively. Each barrier or barrier layer is formed of a film. The first barrier 203 and the second barrier layer 204 are configured to maintain the thickness of the light conversion layer 205. If the thickness of the light conversion layer 205 is not uniform, the degree of the conversion of the lights (or light rays) passing through the light conversion sheet 200 can vary around the entire area of the light conversion layer 205. Due to this, quality of converted light can deteriorate. In view of this, the light conversion layer 205 should maintain a thickness that is as uniform as possible.

Meanwhile, it should be noted that quantum dots are easily affected by moisture. As such, the light conversion layer 205 needs to be protected from moisture permeation. To this end, the first barrier 203 and the second barrier layers 204 can be formed of an inorganic material configured to provide sufficient moisture protection.

The light compensation patterns 206 can be disposed along the upper surface edge of the light conversion sheet 200, for example, at or near the upper surface edge of the second substrate 202. Also, each of the light conversion patterns 206 can be formed in a prism shape or other geometric shape configured to provide the desired light conversion effect.

In addition, a light scattering layer can be coated on the outer surface of the first substrate 201 and/or on the outer side surface of the second substrate 202. The light scattering layer may include a plurality of light scattering units such as beads.

The light conversion layer 205 can be configured with a resin layer having a refractive index value. The resin layer includes a first quantum dot Q1, a second quantum dot Q2 and a bead B. The first quantum dot Q1, the second quantum dot Q2 and the bead B are scattered within the resin layer.

The first and second quantum dots Q1 and Q2 can be formed from one among a group of materials which includes compound semiconductors and alloys of groups II-VI, II-III, III-V, VI-IV, IV in the periodic table and mixture materials thereof.

The first and second quantum dots Q1 and Q2 can be formed from a compound of materials belonging to groups II and VI of the periodic table. In detail, the first and second quantum dots Q1 and Q2 can be formed from among one or more of CdSe, CdS, CdTe, ZnO, ZnSe, ZnS, ZnTe, HgSe, HgTe, and CdZnSe, as well as various mixtures thereof.

The first and second quantum dots Q1 and Q2 can be formed from a compound of materials belonging to groups III and V of the periodic table. In other words, the first and second quantum dots Q1 and Q1 can be formed from among one or more of InP, InN, GaN, InSb, InAsP, InGaAs, GaAs, GaP, GaSb, Alp, AlN, AlAs, AlSb, CdSeTe, and ZnCdSe, as well as various mixtures thereof.

The first and second quantum dots Q1 and Q2 can be formed from a compound of materials belonging to the groups VI and IV of the periodic table. In this case, the first and second quantum dots Q1 and Q2 can be formed from among one or more of PbSe, PbTe, PbS, PbSnTe, and $Ti_2SnTe_5$, as well as various mixtures thereof.

The first quantum dot Q1 can be a red quantum dot generating red light or a green quantum dot generating green light, and the second quantum dot Q2 can be either red or green, which is different from the color of the first quantum dot Q1.

Alternatively, the light conversion layer 205 can be formed to include one quantum dot and one fluorescent substance. For example, the first quantum dot Q1 is a red quantum dot and the second quantum dot Q2 is a green fluorescent substance. As another example, the first quantum dot Q1 is a red fluorescent substance and the second quantum dot Q2 is a green quantum dot.

Each of the first and second quantum dots Q1 and Q2 can have a diameter range of 0.5 nm-30 nm. The resin layer 210 used in the light conversion layer 205 can be formed from one selected from a material group which includes poly (methyl(meth)arylate), polyethylene glycol dimethacrylate), polyvinyl acetate, poly(divinyl benzene), poly(thioether), silica, polyepoxide and mixtures thereof.

The plurality of light compensation patterns 206 with the prism structure is disposed along the edge of the light conversion sheet 200. As such, blue light input from the light guide plate 123 is reflected and refracted by the light compensation patterns 206 of the light conversion sheet 200. In accordance therewith, bluish light is effectively compensated at the edges of the LCD panel 110.

In other words, the light compensation patterns 206 of the light conversion sheet 200 reflects and refracts light being output from the edge of the light conversion sheet 200. As such, blue light can pass through the light conversion layer 205 of the light conversion sheet 200 and can then be converted into white light.

In other words, at the edges of the light conversion sheet 200 having the specific light compensation patterns 206 are configured to reflect and refract more light than a conventional light conversion sheet 200 without such light compensation patterns 206. As a result, the edges of the light conversion sheet 200 with the light compensation patterns 206 can convert more blue light into red and green light. Therefore, bluish light is compensated at the edges of the LCD panel 110.

In this manner, the backlight unit and the LCD device with the same according to the present disclosure employ light compensation patterns along the edge of the light conversion sheet. Therefore, image quality and color gamut of the LCD device 100 can be enhanced.

Also, the backlight unit and the LCD device with the same according to the present disclosure can enable light to be recycled (or additionally reflected and/or refracted) by the light compensation patterns, which has a high refractive index, disposed along the edge of the light conversion sheet. In accordance therewith, color gamut and light efficiency can be enhanced.

FIGS. 5 through 8 are cross-sectional views structurally showing light conversion sheets according to different embodiments of the present disclosure.

The light conversion sheets of the different embodiments are similar to or the same as that of FIG. 4 in terms of the characteristics of the materials of the light conversion layer including the quantum dots, the diameters of the quantum dots and the bead. As such, components of the light conversion sheets of the different embodiments distinguished from that of the previous embodiment will be mainly described.

Figure 5:
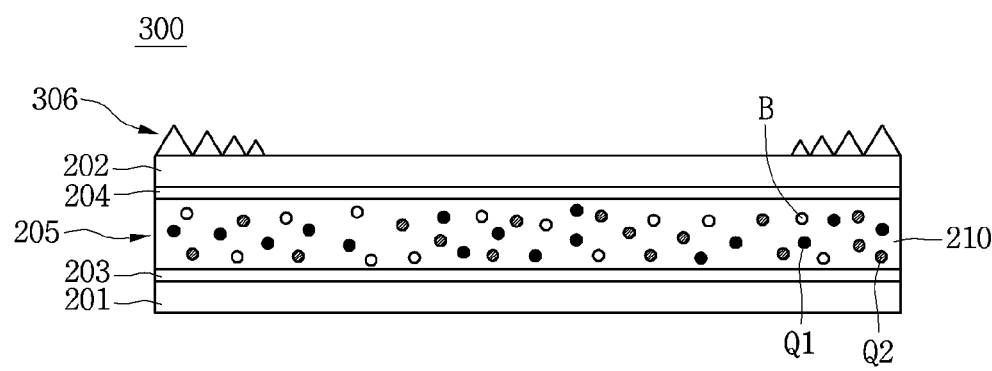
FIGS. 5 through 8 are cross-sectional views structurally showing light conversion sheets according to other embodiments of the present disclosure.

Referring to FIG. 5, a light conversion sheet 300 according to another embodiment of the present disclosure includes a first substrate 201, a second substrate 202 and a light conversion layer 205. Also, the light conversion sheet 300 includes light compensation patterns 306, which have different sizes from one another, are disposed on upper surface edges of the light conversion sheet 300.

The light compensation patterns 306 can be configured to have the largest size at the outmost edge of the light conversion sheet 300. Also, the light compensation patterns 306 can be configured to gradually become smaller in size as they go toward the inside of the light conversion sheet 300. In such manner, these patterns or other similar elements can be implemented with different designs, different dimensions, and attributes depending upon various factors, such as panel size, panel thickness, desired light compensation effect or degree, and the like.

As described above, bluish light is generated along the edge of the light conversion sheet 300 having a certain area. Moreover, the degree of the bluish at the bluish light leaking edge area is varied. In view of this, the prism patterns of the light compensation pattern 306 are formed in different sizes on the basis of the degree of the bluish at the bluish light leaking edge area as illustrated in FIG. 4. In accordance therewith, the light conversion sheet 300 can suppress the degree of the bluish light to provide improved white light output at the edge area.

As seen from a leaked state of bluish light in the related art LCD panel of FIG. 1, the edge area of the LCD panel is bluish but the inward area of the LCD panel is not bluish.

Accordingly, the light compensation pattern 306 at the edge of the light conversion sheet 300 corresponding to the bluish light leaking edge area of the LCD panel compensates the bluish light at the edge area of the LCD panel. As such, the backlight unit and the LCD device with the same according to the present disclosure can provide a natural white balance overall area for the LCD device.

Figure 6:
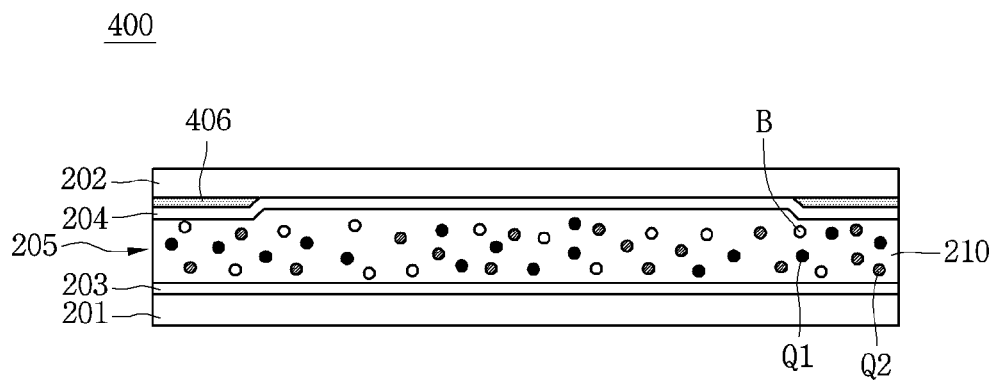

As shown in FIG. 6, a light conversion sheet 400 according to still another embodiment of the present disclosure includes a first substrate 201, a second substrate 202 and a light conversion layer 205. The light conversion sheet 400 includes light compensation pattern 406 interposed between a second barrier layer 204 and the second substrate 202. The light compensation pattern 406 is disposed on the edge or circumference of the upper surface of the light conversion layer 205.

The light compensation pattern 406 can includes a material which has a higher refractive index than that of the light conversion layer 205.

Such light compensation pattern 406 refracts or reflects bluish light being leaked from the edge area of the light conversion sheet 400 in inward directions of the light conversion sheet 400 such that the refracted or reflected bluish light can be recycled (or additionally directed) to hit (or contact) the quantum dots more frequently to compensate the bluish light.

In detail, bluish light refracted or reflected from the edge area of the light conversion sheet 400 toward the inside of the light conversion sheet 400 can be converted into white light because the optical sheets are disposed on the light conversion sheet 400. For example, the optical sheets may include a diffusion sheet and a light collecting sheet.

Moreover, bluish light refracted and/or reflected by the light compensation patterns 406 can be recycled by the light conversion sheet 400 and the light guide plate disposed thereunder. As such, recycled bluish light can be output through the optical sheets. In accordance therewith, leakage of bluish light can be compensated and furthermore efficiency in terms of the brightness can be enhanced.

Figure 7:
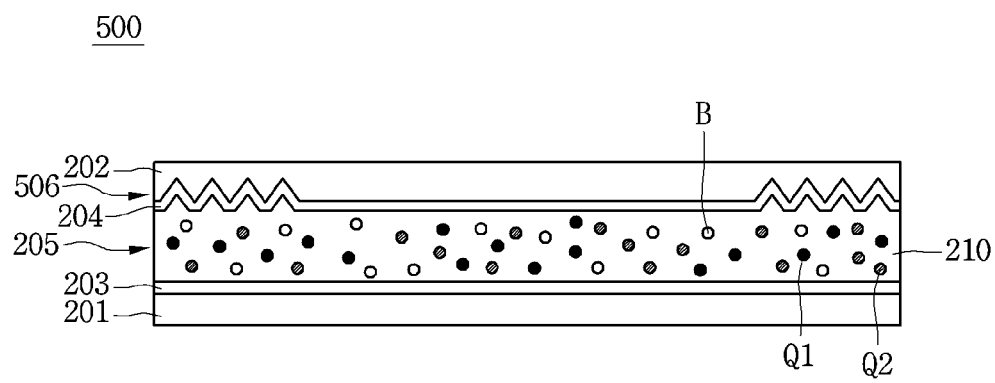

Referring to FIG. 7, a light conversion sheet 500 according to further still another embodiment of the present disclosure includes a first substrate 201, a second substrate 202 and a light conversion layer 205. Also, the light conversion sheet 500 includes light compensation patterns 506 on the inner surface of the second substrate 202. The light compensation pattern 506 is disposed on the edge or circumference of the upper surface edge of the light conversion layer 205. For example, the prism shape of the light compensation patterns 506 can be referred as an inverted prism intaglio shape.

The light compensation patterns 506 of FIG. 7 can have substantially the same purpose and effect as the light compensation patterns 206 of FIG. 4 and thus redundant features will not be described (merely for the sake of brevity).

Figure 8:
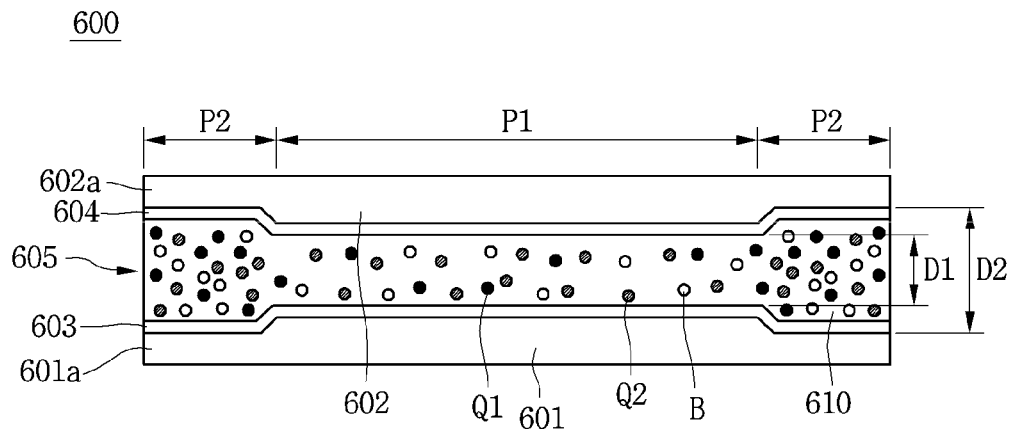

Referring to FIG. 8, a light conversion sheet 600 according to still another embodiment of the present disclosure includes first and second substrates 601 and 602 formed of a transparent insulation material such as PET, and a light conversion layer 605 interposed between the first and second substrates 601 and 602. Also, the light conversion sheet 600 includes a first barrier 603 interposed between the first substrate 601 and the light conversion layer 605, and a second barrier layer 604 interposed between the light conversion layer 605 and the second substrate 602.

The light conversion sheet 600 can be defined into a first area P1 and a second area P2. The first area P1 corresponds to a light output area (or a central area) configured to output converted light. The second area P2 corresponds to an edge area of the light conversion sheet 600 which surrounds the first area P1. The light conversion layer 605 is formed to be different (i.e. thicker) in the second area P2 than the first area P1.

The first substrate 601 includes a first stepped portion 601a formed in its edge or circumference of the second area P2 of the light conversion sheet 600. Similarly, the second substrate 602 includes a second stepped portion 602a formed in its edge or circumference of the second area P2 of the light conversion sheet 600.

As such, the thickness D2 of the light conversion layer 605 in the second area P2 corresponding to the edge of the light conversion sheet 600 is different from the thickness D1 of the light conversion layer 605 in the first area P1 corresponding to the inward or central area of the light conversion sheet 600.

The first stepped portion 601a of the first substrate 601 and the second stepped portion 602a of the second substrate 602 enables the light conversion layer 605 within the second area P2 of the light conversion sheet 600 to be formed in a larger thickness compared to the light conversion layer 605 within the first area P1 of the light conversion sheet 600.

As such, the amount of first quantum dots Q1, second quantum dots Q2 and beads B within the light conversion layer 605 is greater in the second area P2 corresponding to the edge the light conversion sheet 600 than in the first area P1 corresponding to the inward or central portion of the light conversion sheet 600. Therefore, the quantity of bluish light in the edge of the light conversion sheet 600 can be minimized.

In this way, the light conversion sheet 600 according to the present disclosure enables not only the thickness of the light conversion layer 605 to be adjusted but also allows the density of the quantum dots within the light conversion layer 605 to be varied, on the basis of the areas. Therefore, the degree of bluish light in the edge area of the light conversion sheet 600 can be reduced.

As described above, the backlight unit and the LCD device with the same according to the present disclosure employs light compensation patterns disposed along the edge of the light conversion sheet. Therefore, image quality and color gamut of the LCD device can be enhanced.

Moreover, the backlight unit and the LCD device with the same according to the present disclosure can enable the light compensation patterns with a high refractive index to be disposed along the edge of the light conversion sheet. In accordance therewith, light can be recycled and furthermore color gamut and light efficiency of the LCD device can be enhanced.

Meanwhile, the features of the embodiments may be also described as follows.

An apparatus comprising a guide member (e.g. light guide plate) configured to receive light, which exhibits particular wavelength characteristics of one specific color with respect to a color spectrum (e.g. blue color spectrum), emitted from a light source component and to guide the received light towards a display panel and a converting member located optically downstream from said guide member and configured to have a particular refractive index and to have a specific distribution of color spectrum shifting material with quantum mechanical properties, said color spectrum shifting material exhibiting excitation and emission characteristics according to said specific distribution, said converting member, due to said refractive index and said semiconductor material, allowing the light of said one specific color received from said guide member to be converted into white light that exhibits wide color gamut properties, and said converting member having one or more among edges, boundaries, peripheral areas, and combinations thereof configured to create increased refractions or reflections of light with respect to said color spectrum shifting material within said converting member such that the light of said one specific color received from said guide member but leaked at edges of said converting member is re-directed and effectively compensated by said increased refractions or reflections.

A backlight unit comprising a light guide plate configured to guide blue light from a blue light source and a light conversion sheet comprising a light conversion layer and a light compensation pattern on edges of the light conversion layer configured to compensate for leakage of blue light guided from the light guide plate, the leakage occurring at the edges of the light conversion sheet.

The light conversion layer includes a first light conversion element configured to convert a portion of the blue light into a portion of green light and a second light conversion element configured to convert another portion of the blue light into a portion of a red light. The light compensation pattern comprises a plurality of prisms. Sizes of the plurality of prisms are configured to be gradually increased from an inner side of the light conversion sheet to an outer side of the light conversion sheet. The light conversion sheet further comprising a first barrier configured to cover a front surface of the light conversion layer, a second barrier configured to cover a rear surface of the light conversion layer, a first substrate on the first barrier and a second substrate on the second barrier. The light compensation pattern is positioned between the first barrier and the first substrate and the light compensation pattern has a higher refractive index than the light conversion layer. The light compensation pattern is formed of the first substrate having an inverted prism intaglio shape. The first barrier and the second barrier layer are formed an inorganic material. At least one light scattering layer comprises a plurality of light scattering elements on the outer surface of at least one of the first and second substrates.

The light conversion layer comprises a plurality of beads. The light conversion layer is formed from a resin material which includes one of poly(methyl(meth)arylate), poly(ethylene glycol dimethacrylate), polyvinyl acetate, poly(divinyl benzene), poly(thioether), silica, polyepoxide and mixtures thereof.

A backlight unit comprising a light guide plate configured to guide blue light from a blue light source and a light conversion sheet comprising a light conversion layer configured to compensate blue light leakage at the edges of the light conversion sheet having a first thickness within a first area and a second thickness within a second area, wherein the second area is the edges of the first area and the second thickness is thicker than the first thickness, wherein the light conversion layer including a first light conversion element configured to convert a portion of the blue light into a portion of green light and a second light conversion element configured to convert another portion of the blue light into a portion of a red light.

The amount of the light conversion elements within the second area is more than the amount of the light conversion elements within the first area. The light conversion sheet further comprises a first substrate having a first stepped portion within the second area and a second substrate having a second stepped portion within the second area.

A liquid crystal display device comprising a liquid crystal display panel, a light guide plate configured to guide blue light from a blue light source to the liquid crystal display panel and a light conversion sheet comprising a light conversion layer and a light compensation pattern positioned on edges of the light conversion layer configured to compensate blue light leakage at the edges of the light conversion sheet, wherein the light conversion sheet is positioned between the liquid crystal display panel and the light guide panel.

The light conversion layer including a first light conversion element configured to convert a portion of the blue light into a portion of green light and a second light conversion element configured to convert another portion of the blue light into a portion of a red light. The light compensation pattern comprises a plurality of prisms. At least one light conversion element is a quantum dot. At least one light conversion element is a fluorescent substance. The quantum dot has a diameter range from 0.5 nm to 30 nm.

It will be apparent to those skilled in the art that various modifications and variations can be made in the backlight unit and liquid crystal display device including the same of the present invention without departing from the spirit or scope of the invention. Thus, it is intended that the resent invention cover the modifications and variations of this invention provided they come within the scope of the appended claims and their equivalents.

What is claimed is:

1. A liquid crystal display device, comprising:
   a liquid crystal display panel;
   a light guide plate configured to guide blue light from a blue light source to the liquid crystal display panel;
   a light conversion sheet comprising
      a light conversion layer,
      a light compensation pattern positioned on edges of the light conversion layer configured to compensate for leakage of blue light guided from the light guide plate, the leakage occurring at the edges of the light conversion sheet,
      a first barrier film configured to cover and directly contact a front surface of the light conversion layer, and
      a second barrier film configured to cover and directly contact a rear surface of the light conversion layer,
   wherein the first barrier film and the second barrier film are formed of an inorganic material, and
   wherein the first barrier film and the second barrier film are configured to maintain a uniform thickness together with the light conversion layer; and
   a plurality of optical sheets comprising a diffusion sheet and at least one light collecting sheet, wherein the plurality of optical sheets is positioned between the liquid crystal display panel and the light conversion sheet,
   wherein the light conversion sheet is positioned between the liquid crystal display panel and the light guide plate, and the light compensation pattern includes a plurality of prisms, a central area of the light conversion layer is not covered by the light compensation pattern,
   the plurality of prisms is configured to reflect the blue light leaked from the light guide plate,
   each of the plurality of prisms has a shape of a triangle, and
   the light compensation pattern is positioned in a display area.

2. The liquid crystal display device of claim 1, wherein the light conversion layer includes a first light conversion element configured to convert a portion of the blue light into a portion of green light and a second light conversion element configured to convert another portion of the blue light into a portion of a red light.

3. The liquid crystal display device of claim 2, wherein a size of the plurality of prisms are configured to be gradually increased from an inner side of the light conversion sheet to an outer side of the light conversion sheet.

4. The liquid crystal display device of claim 2, wherein the light conversion sheet further comprising a first substrate on the first barrier film and a second substrate on the second barrier film.

5. The liquid crystal display device of claim 4, wherein the light compensation pattern is formed of the first substrate having an inverted prism intaglio shape.

6. The liquid crystal display device of claim 4, further comprising at least one light scattering layer comprising a plurality of light scattering elements on the outer surface of at least one of the first and second substrates.

7. The liquid crystal display device of claim 1, wherein the light conversion layer further comprising a plurality of beads.

8. The liquid crystal display device of claim 1, wherein the light conversion layer is formed from a resin material which includes one of poly(methyl(meth) acrylate), poly (ethylene glycol dimethacrylate), polyvinyl acetate, poly (divinyl benzene), poly(thioether), silica, polyepoxide and mixtures thereof.

9. The liquid crystal display device of claim 2, wherein at least one of the first light conversion element and the second light conversion element includes a quantum dot.

10. The liquid crystal display device of claim 2, wherein at least one of the first light conversion element and the second light conversion element includes a fluorescent substance.

11. The liquid crystal display device of claim 9, wherein the quantum dot has a diameter range from 0.5 nm to 30 nm.

* * * * *